United States Patent [19]

Bloom

[11] 4,318,166
[45] Mar. 2, 1982

[54] OPTIMUM TOPOLOGY HIGH VOLTAGE DC TO DC CONVERTER

[75] Inventor: Gordon E. Bloom, Newbury Park, Calif.

[73] Assignee: Litton Systems, Inc., Beverly Hills, Calif.

[21] Appl. No.: 163,126

[22] Filed: Jun. 26, 1980

[51] Int. Cl.$^3$ .............................................. H02P 13/18
[52] U.S. Cl. ...................................................... 363/26
[58] Field of Search .................................. 363/22–26, 363/56, 97, 133

[56] References Cited

U.S. PATENT DOCUMENTS 3,553,620  1/1971  Cielo et al. ............................ 363/25
3,846,691  11/1974  Higgins .................................. 363/25
4,176,392  11/1979  Cronin et al. ......................... 363/26

*Primary Examiner*—William H. Beha, Jr.
*Attorney, Agent, or Firm*—Roy L. Brown

[57] ABSTRACT

A DC to DC converter is shown having an inductor with primary and secondary windings whose primary winding is serially connected to the center tap of the primary winding of a push-pull transformer. The primary of the transformer is then connected through its ends by a pair of transistor switches to ground while the ends of the secondary of the transformer connect through diodes to an output terminal. The ends of the secondary of the transformer also connect through diodes to the inductor secondary and then to the output terminal. The presence of the inductor prevents the voltage across the switches from becoming twice the input voltage as in conventional circuits. By equalizing the secondary to primary turns ratio between the inductor and transformer, it is possible to equalize the voltage output during the time intervals when the switches are on and off.

5 Claims, 4 Drawing Figures

OPTIMUM TOPOLOGY HIGH VOLTAGE DC TO DC CONVERTER

FIELD OF THE INVENTION

The present invention relates to a DC to DC converter and, more particularly, to a DC to DC converter utilizing a transformer in series with a push-pull converter which drives a load.

BACKGROUND OF THE INVENTION

DC to DC converters are often used in association with rectified and filtered AC line voltage. Converters that utilize a line voltage which has been rectified and filtered without the use of a transformer are referred to as "off-line" converters. In such converters, the input voltage often exceeds 200 volts due to peaks in the ripple voltage. Use of an off-line converter is desirable, however, as it eliminates the need for a transformer in the input stage. On the other hand, the off-line converter has a disadvantage in that it places a voltage stress on its switching network which is equal to twice the input voltage.

One typical off-line converter design utilizes a four transistor bridge and a transformer to reduce the 200 volt input to a desirable level. The four transistor bridge is used to reduce the voltage stress generally applied across its switching network. The disadvantage of this arrangement is that the four power switches require associated drive circuitry which is often complex.

Another off-line converter design utilizes a half bridge configuration with a pair of capacitors and a transformer to accomplish voltage conversion. This arrangement has the disadvantage of requiring two large capacitors with high ripple currents.

A typical push-pull transformer used in a converter circuit generally places a voltage equal to twice the input voltage across the emitter to collector junction of the transistor switches. This can create a limiting design factor when high DC input voltages are to be converted. The design is further limited by the fact that high current spikes created by overlapping of the transistors as they switch on and off add to the stress across the transistors.

For a discussion of the three basic types of DC to DC converters including a flyback converter, a forward converter and a push-pull converter, see van der Poel, Jan M., "Pick The Right DC/DC Converter", *Electronic Design*, June 7, 1978, pp. 104–108. This article mentions the problem of twice the input voltage across the transistors at page 106.

SUMMARY OF THE INVENTION

The present invention provides an improved high voltage DC to DC converter which eliminates the need for complex drive circuitry or two large capacitors as required in full bridge or half bridge configurations of the prior art.

The present invention utilizes a unique combination of a flyback converter in series with a push-pull converter which is controlled by a pair of transistor switches. By utilizing an auxiliary transformer in series with the push-pull transformer, the voltage stress on the transistor switches is reduced from the prior art of two times the input voltage to 70 percent, for example, of that voltage. Further, the arrangement of the invention protects the power transistor switches from high current spikes caused by the transistors when they are energized at the same time or when the transformer goes into saturation.

In accomplishing the features or objects outlined above, there is provided an auxiliary transformer which is serially connected between an input terminal and a push-pull converter transformer. The primary winding of the auxiliary transformer connects to the center tap of the primary winding of the center-tapped push-pull transformers whose ends are connected by a pair of switching transistors to ground. The center tap of the push-pull transformer secondary is connected to ground while the ends of that transformer secondary connect to an output terminal through a pair of diodes. The secondary of the auxiliary transformer connects from the ends of the push-pull transformer secondary through a pair of diodes to the output terminal. Also connected from the output terminal to ground is a smoothing capacitor.

The circuit thus described exhibits equal inductance-capacitance products during the on and off times of the switching transistors when the secondary to primary turns ratio of the auxiliary transformer is equal to the secondary to primary turns ratio of the push-pull transformer. This arrangement permits the DC to DC converter to be adjusted for constant output voltage by varying the duty cycle or on-off time of the transistor switches.

DESCRIPTION OF THE DRAWINGS

Other objects and advantages of the present invention will become apparent to those skilled in the art after a careful consideration of the following specification in view of the accompanying drawings wherein.

DESCRIPTION OF THE PREFERRED EMBODIMENT

Figure 1:
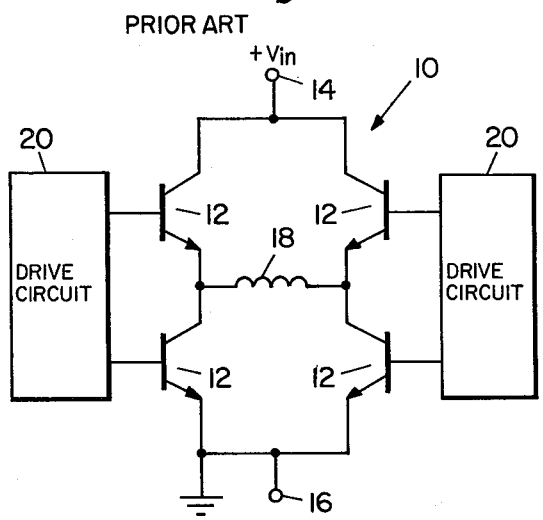
FIG. 1 is a schematic diagram of an off-line converter of the prior art using a four transistor bridge.

Referring now to FIG. 1, a conventional off-line converter 10 is shown constructed from a transistor bridge including four transistors 12 connected between an input terminal 14 and a return terminal 16. The transistors 12 include NPN transistors two of which have their collectors connected to the input terminal 14 while the emitters thereof connect to the collectors of the remaining two transistors whose emitters are connected to the return terminal 16. Connected between the emitter-collector junctions of the two pairs of transistors is an inductor 18. Each transistor is driven by drive circuits 20 which apply signals to each transistor base for controlling the on-off cycle thereof. The disadvantage of the circuit thus described is that the four power switching transistors require complex drive circuits and introduce current spikes across their emitter-collector terminals when more than one is on at the same time.

Figure 2:
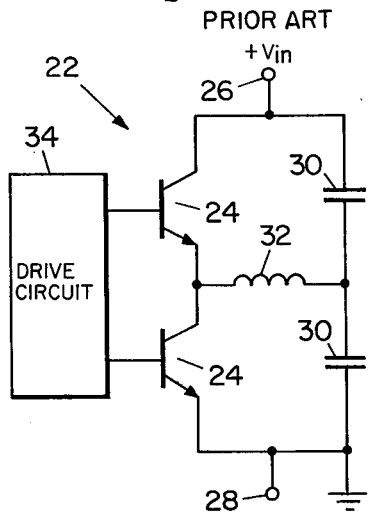
FIG. 2 is a schematic diagram of an off-line configuration of the prior art using a half bridge.

A second off-line converter 22 utilizing a half bridge formed from two transistors 24 is shown in FIG. 2. The first transistor 24 connects from its collector to an input terminal 26 while its emitter connects to the collector of the second transistor whose emitter, in turn, connects to a return terminal 28. Also connected between the input and output terminals 26 and 28 are a pair of serially connected capacitors 30 whose common junction is joined to the emitter collector junction between transistors 24 by an inductor 32. As in FIG. 1, the switching transistors 24 are driven by a drive circuit 34 which applies signals to the base of each transistor 24. The half bridge configuration has the disadvantage of requiring large capacitors which must be able to withstand high AC ripple currents.

Figure 3:
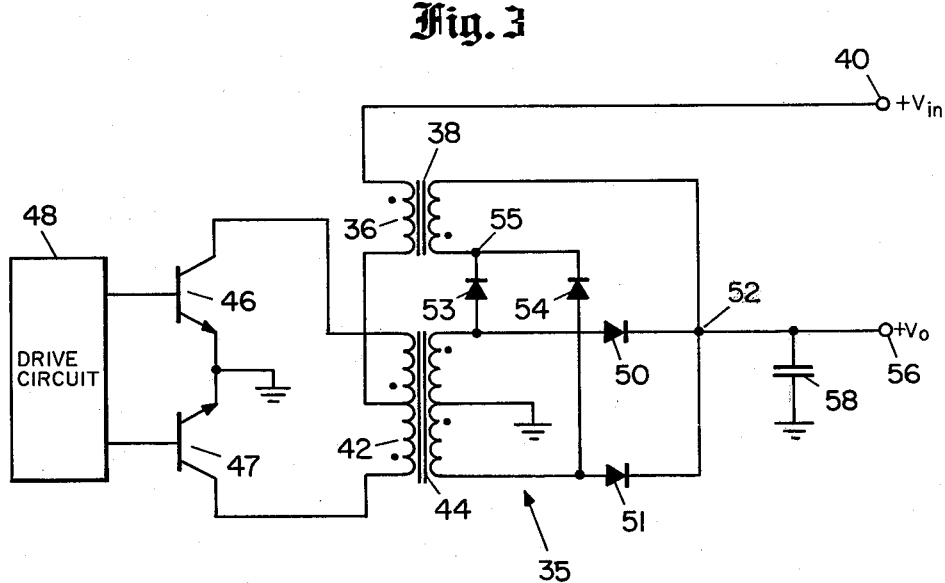
FIG. 3 is a schematic diagram of the DC to DC off-line converter of the present invention.

Referring now to FIG. 3, a high voltage, off-line DC to DC converter is shown at 35 that does not require the complex switching or large capacitors of the prior art circuits described above with regard to FIGS. 1 and 2. The converter 35 consists of an auxiliary transformer 38 whose windings are wound about an iron core 38 having primary and secondary windings wherein the turns ratio of the secondary winding to the primary winding ($N_L$) is 0.33, for example. This ratio may be set at many desired values; but, in the preferred embodiment, it has been chosen to equal 0.33 for reasons which will become apparent hereinbelow. One end of the primary winding 36 is connected to an input terminal 40 while the second end thereof connects to the center tap of a primary winding 42 of a transformer 44. The transformer 44 is a push-pull conversion transformer having primary and secondary windings with center taps closely wound about a core 44. The secondary to primary turns ratio ($N_T$) of the transformer 42 is fixed at 0.33, equal to the secondary to primary turns ratio of the transformer 38 ($N_L = N_T$).

Connected to each end of the primary winding 42 of the transformer 44 are transistors 46 and 47 whose collectors connect to the ends of the winding 42 and whose emitters are connected to ground. The bases of transistors 46 and 47 are driven by a drive circuit 48 which provides appropriate signals to the base of each transistor 46 and 47 for controlling the duty cycle of the push-pull transformer 44. The secondary winding of transformer 44 includes a center tap that is connected to ground while the opposite ends of the secondary winding connect to the anode terminals of diodes 50 and 51 whose cathode terminals are connected to a junction node 52 and the output terminal 56. The opposite ends of the secondary winding of transformer 42 are also connected to the anode terminals of diodes 53 and 54 whose cathode terminals connect to a junction 55 and to one end of the secondary winding of transformer 38; the other end of the secondary winding connects to the junction node 52 and the output terminal 56.

Connected from the output terminal 56 to ground is a smoothing capacitor 58 which functions to eliminate AC ripple in the output signal at terminal 56. The operation of the DC to DC converter is controlled by the drive circuit 48 which turns on and off switching transistors 46 and 47.

Figure 4:
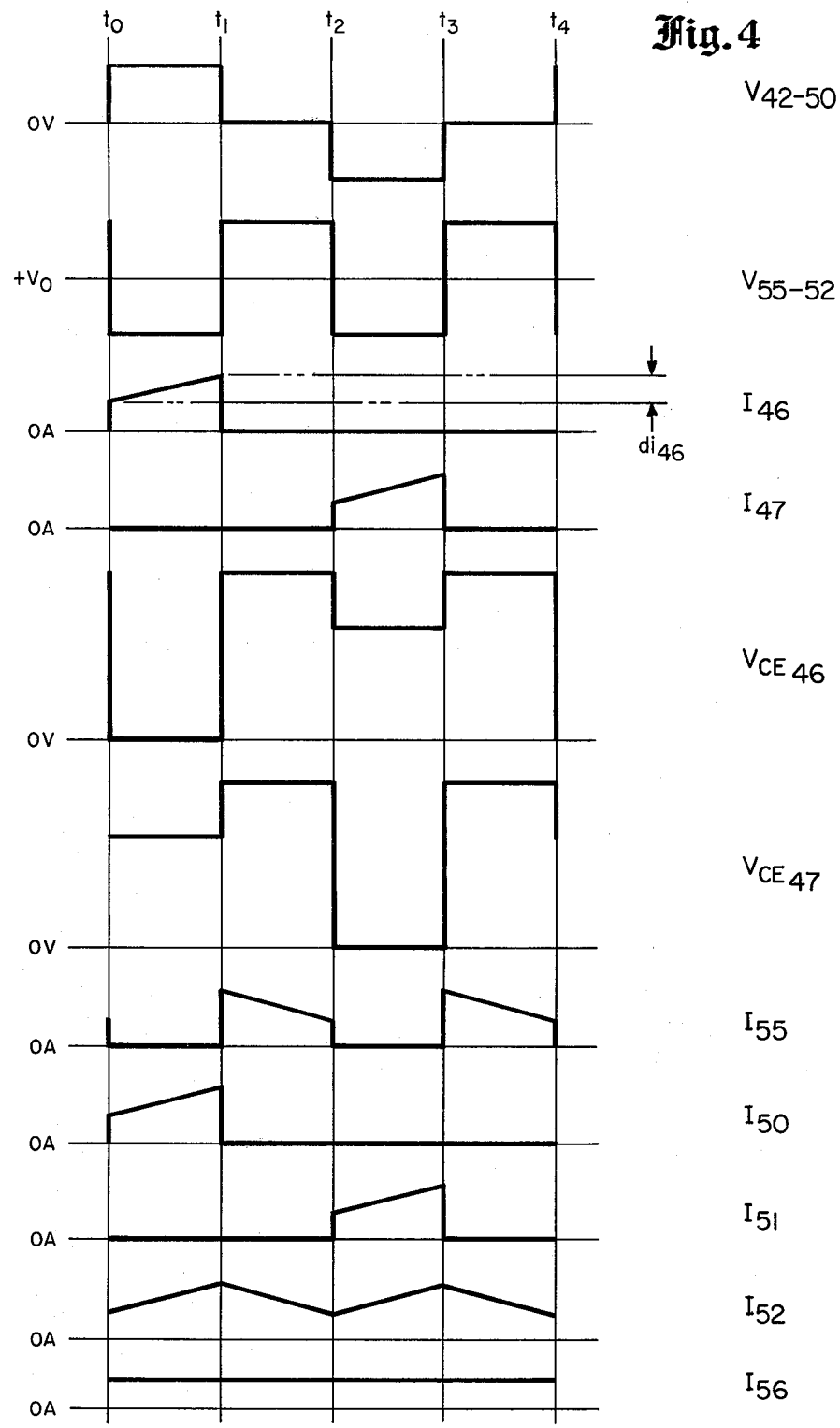
FIG. 4 illustrates waveforms of the circuit of FIG. 3 useful in describing the operation of that circuit.

During the time that transistor 46 is on and transistor 47 is off, or the first quarter of the duty cycle, $t_0$ to $t_1$, FIG. 4, the voltage across the winding 36 rises to a positive level as does the voltage across the winding 42. Because of the relative phasing of the voltages on the winding 36 and winding 42, the voltage across the secondary winding of transformer 38 from the cathodes of diodes 53 and 54 at junction 55 to the junction node 52 goes negative, while the voltage across the secondary winding of transformer 44 to the anode of diode 50 goes positive. The current through transistor 46 rises quickly to a given level and then more slowly during the time the transistor 46 remains on, as indicated by I46 in FIG. 4. During this same time, the voltage across transistor 46 is zero while the voltage across transistor 47 is the equivalent of the voltage output ($V_O$) divided by the secondary to primary turns ratio of the push-pull transformer ($N_T$) times two.

$$V_{CE47} = 2V_O/N_T$$

Where $V_O$ is 28VDC and $N_T$ is 0.33, in the present example, $V_{CE47} = 170$ VDC. As the voltage across winding 42 goes positive, the anode of diode 50 becomes more positive than its cathode connected to junction 52 for turning diode 50 on. The cathodes of diodes 53 and 54 at junction 55 are more positive than the junction 52 and remain off.

During the next time interval, or second quarter $t_1$ to $t_2$, transistors 46 and 47 are off. The energy stored in the inductor 36 is now supplied to the output capacitor 58 through diodes 53 and 54 as indicated by the positive voltage $V_{55-52}$ in FIG. 4. Because diodes 53 and 54 conduct through both halves of the secondary winding of transformer 44, the energy stored in 44 is completely dissipated. In the circuit under consideration, the maximum voltage across transistors 46 and 47 occurs when both transistors are off. In conventional circuits, the voltage would be 400 VDC, for example, or twice the input voltage. However, in the present invention, the voltage across the transistors ($V_{CE46}$) is equal to the voltage in ($V_{in}$) plus the voltage out ($V_0$) all divided by the secondary to primary turns ratio ($N_L$) of the auxiliary transformer.

$$V_{CE46(MAX)} = V_{in} + V_0/N_L$$

As stated before, the input voltage in the present example is established at 200 VDC while the output voltage is established at 28VDC and the secondary to primary turns ratio is 0.33. Thus, the maximum voltage across the switches 46 or 47 is 71 percent of the conventional configuration voltage or 284 VDC.

During the third time interval, $t_2$ to $t_3$, transistor 47 is turned on for applying a voltage across the winding 36 and winding 42. This voltage appears across the secondary of inductor 36 and applied by the secondary winding of transformer 42 through diode 51 to the junction 52. The current through the transistor 47 increases as in the first quarter of the duty cycle while the voltage thereacross is zero, and the voltage across transistor 46 is equal to 170 VDC.

During the last time interval, or fourth quarter, of the duty cycle both transistor switches 46 and 47 are off. In this portion of the cycle $t_3$ to $t_4$, the waveforms are the same as during the second quarter of the cycle. The combination of the currents of diodes 50, 51, 53 and 54, presents a voltage at junction 52 which is substantially linearly related to the input voltage ($V_{IN}$). Capacitor 58 serves to smooth this voltage so that the output potential at terminal 56 is generally constant throughout the duty cycle. By adjusting the length of time that transistor switches 46 and 47 are on, it is possible to maintain the output at terminal 56 at a invariant level.

To achieve linearity of the current at node 52 during the duty cycle, the transformer turns ratio $N_T$ has been established to equal the transformer turns ratio $N_L$. It was found by experimentation and mathematical analysis that the circuit exhibits equal inductance-capacitance products during the times when the transistors 46 and 47 are on and off only when the ratio $N_L$ equals the ratio $N_T$. The circuit thus described may be adjusted to increase its output by shortening the time interval during the second and fourth quarter of the duty cycle when the transistors 46 and 47 are off. During such adjustment of circuit output, the output voltage will remain linearly related to the input voltage due to the equivalence of $N_T$ and $N_L$. When the duty cycle of a converter is 100 percent, both transistors can be on simultaneously due to a long storage time of the transistor which is turning off. Large current spikes during this mode of operation are avoided in the configuration shown because of the transformer 38 which absorbs the line voltage and limits the peak current flow.

Another advantage of the circuit is that the input current is limited by the series input winding 36. If the transformer 42 saturates, the inductor 36 absorbs the additional voltage and limits the peak input current during the time that the transistors 46 and 47 are on until they can be turned off.

The circuit thus described includes an input voltage of 200 VDC and an output voltage of 28 VDC. The secondary to primary turns ratio of both the transformer 38 and transformer 42 has been described as equal to 0.33. Clearly, other input and output voltages as well as other turns ratios may be used; and the present invention should be limited only by the appended claims.

I claim:

1. A DC to DC converter for converting the high voltage rectified and filtered DC input to a lower DC output voltage, comprising:
    a first transformer having primary and secondary windings whose secondary to primary turns ratio is $N_L$;
    a second transformer having center-tapped primary and secondary windings whose secondary to primary turns ratio is $N_T$ equal to $N_L$;
    an input terminal connected in series through said primary winding of said first transformer to the center tap of said primary winding of said second transformer;
    first switching means sequentially connecting each of the ends of said second transformer primary winding to ground;
    an output terminal;
    second switching means sequentially connecting each of the ends of said second transformer secondary winding to said output terminal;
    the center tap of the secondary winding of said second transformer being connected to ground;
    third switching means connecting said secondary winding of said first transformer in series between said secondary winding of said second transformer and said output terminal; and
    drive means for controlling said first switching means.

2. A DC to DC converter, as claimed in claim 1, wherein said second switching means comprises first and second diodes with the cathodes of said diodes both connected to said output terminal and the anodes of said first and second diodes connected to said first and second ends of said secondary winding of said second transformer, respectively;
    and said third switching means comprises third and fourth diodes with the anodes of said third and fourth diodes connected to the first and second ends, respectively, of said secondary winding of said second transformer, and the cathodes of said third and fourth diodes being connected together to said first end of said secondary winding of said first transformer whose second end connects to said output terminal.

3. A converter for converting high voltage dc to lower voltage dc, comprising:
    first transformer means having primary and secondary windings,
    second transformer means having center-tapped primary and secondary windings,
    an input terminal connected through said first transformer primary winding to the center tap of said second transformer primary winding,
    first switching means for consecutively connecting the ends of said second transformer primary winding to ground, and
    third switching means consecutively connecting the secondary winding of said first transformer in series between a first end of the secondary winding of said second transformer and said output terminal and a second end of said secondary winding of said second transformer and said output terminal;
    the turns ratios of said transformers being equal.

4. A converter, as claimed in claim 3, wherein said first switching means are transistor means, and said second and third switching means are diode means.

5. A converter, as claimed in claim 3, wherein said driving circuit means comprises a pair of bipolar transistors wherein first one of said pair of bipolar transistors conducts for a first conduction period, and then said second one of said pair of bipolar transistors conducts for a second conduction period with two adjustable time intervals of nonconduction of said transistors between said first and second conduction periods for establishing a converter having a four part duty cycle that adjusts the converter output.

* * * * *